(No Model.)
D. W. BASH.
CULTIVATOR.
No. 327,754. Patented Oct. 6, 1885.
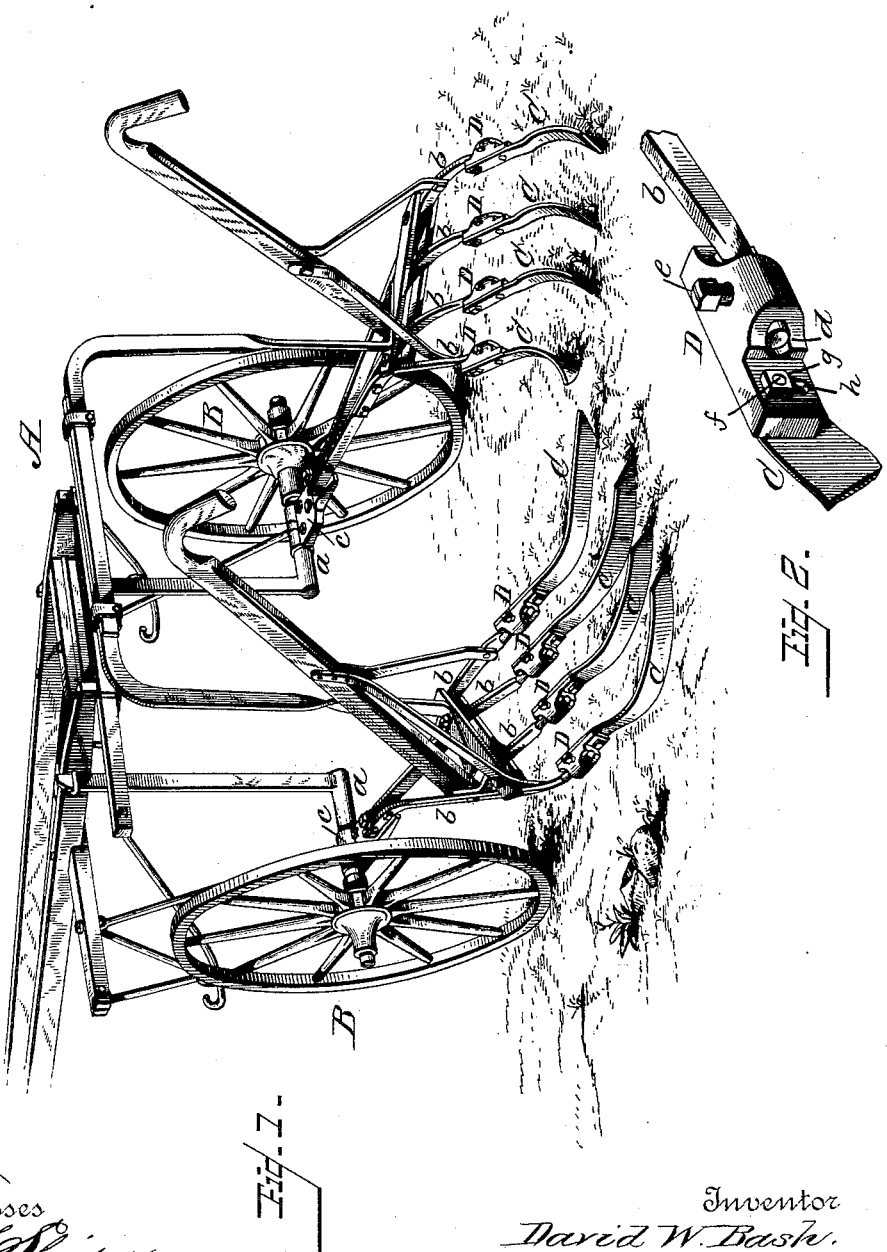

UNITED STATES PATENT OFFICE.

DAVID W. BASH, OF CHATSWORTH, ILLINOIS.

CULTIVATOR.

SPECIFICATION forming part of Letters Patent No. 327,754, dated October 6, 1885.

Application filed August 5, 1885. Serial No. 173,625. (No model.)

*To all whom it may concern:*

Be it known that I, DAVID W. BASH, a citizen of the United States, residing at Chatsworth, in the county of Livingston and State of Illinois, have invented certain new and useful Improvements in Corn-Cultivators; and I do hereby declare that the following is a full, clear, and exact description of the same, reference being had to the annexed drawings, making a part of this specification, and to the letters and figures of reference marked thereon, in which—

Figure 1 is a perspective view of the cultivator complete. Fig. 2 is a detail showing the knife-coupling.

The present invention relates to improvements in the blades or shovels of corn or other cultivators, whereby the destruction of weeds and grass growing in fields of corn, cotton, tobacco, potatoes, and other products may be more effectual and the pulverizing and mellowing the earth around and near the growing plants may be more thoroughly accomplished.

The invention therefore consists in the construction of the blades or shovels and their relative arrangement and manner of connecting them to their arms so as to render them adjustable in two different directions, as will be hereinafter described and claimed.

In the accompanying drawings, A designates the frame, of any suitable construction, provided with the wheels B, loosely mounted upon the axles *a*.

The shovels or blades, which are represented at C, are arranged in gangs—each shovel slightly increasing in breadth in a direction toward its outer extremity, the lower border having a cutting-edge—and are curved inwardly from their point to their shank.

If preferred, the shovels may be of the same width throughout their length, and are each connected by a bracket, D, to the arms *b*, the two outer arms of each gang of shovels or blades being connected to brackets *c*, loosely mounted on the short axles *a*, and the two inner arms secured to the outer arms, as shown.

Each gang of shovels or blades is provided with a handle, connected by braces to the two outer arms, the handles projecting up therefrom at an angle within reach.

The outer extremities of the arms *b* have rounded ends, which pass through holes *d* in the brackets, and the brackets held thereon by the set-screws *e*.

By the above means the shovels or blades may be adjusted on the arc of a circle by turning the bracket the required distance to bring the shovel or blade to the necessary angle to a perpendicular, it being held in its adjusted position by the set-screw. A vertical adjustment is also given to the shovels or blades C by means of the bolt *f* and nut *g*, said bolt passing through the shovels or blades and through the slot *h* in the bracket D. Any suitable means, however, may be used to render the shovels or blades adjustable in both directions—viz., on the arc of a circle and vertically. These adjustments enable the shovels or blades to be set to the condition of the soil and character of the grass and weeds.

Each shovel or blade, as before stated, curves inwardly, which form keeps the earth longer before them than if they were straight, and consequently enables a more thorough pulverizing of the soil.

The shovels or blades on either side of the gang can be detached and interchanged, so as to throw the earth from instead of toward the plants when it is desirable to do so.

My invention is equally applicable to both a wheel or walking cultivator, and therefore I reserve the right to make such change as comes within the scope of my invention.

Having now fully described my invention, what I claim as new, and desire to secure by Letters Patent, is—

1. A cultivator provided with a series of shovels or blades arranged in gangs and capable of an adjustment on an arc of a circle and a vertical adjustment, substantially as and for the purpose specified.

2. In a cultivator, the combination, with the shovels or blades thereof and the arms having their ends rounded, of an intermediate connection between the shovels or blades and arms, consisting of a bracket having a hole to receive the rounded end of the arm, a set-screw to retain the bracket thereon, and a bolt, nut, and slot for adjustably connecting the shovel or blade to the bracket, substantially as and for the purpose specified.

In testimony that I claim the above I have hereunto subscribed my name in the presence of two witnesses.

DAVID W. BASH.

Witnesses:
PERRY F. REMSBERG,
CHARLES TRUE.